United States Patent
Rothkopf et al.

(10) Patent No.: US 8,477,490 B2
(45) Date of Patent: Jul. 2, 2013

(54) COOLING SYSTEM FOR MOBILE ELECTRONIC DEVICES

(75) Inventors: Fletcher Rothkopf, Los Altos, CA (US); Teodor Dabov, San Francisco, CA (US); David Kumka, Briarcliff Manor, NY (US)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 13/099,122

(22) Filed: May 2, 2011

(65) Prior Publication Data

US 2012/0281354 A1 Nov. 8, 2012

(51) Int. Cl.
H05K 7/20 (2006.01)

(52) U.S. Cl.
USPC ............ 361/679.48; 361/679.46; 361/679.49; 361/690; 361/695

(58) Field of Classification Search
None
See application file for complete search history.

(56) References Cited

U.S. PATENT DOCUMENTS

| | | |
|---|---|---|
| 4,104,523 A | 8/1978 | Wolfert |
| 4,614,528 A | 9/1986 | Lennen |
| 4,620,248 A | 10/1986 | Gitzendanner |
| 4,863,499 A | 9/1989 | Osendorf |
| 4,982,783 A | 1/1991 | Fickett et al. |
| 5,025,336 A | 6/1991 | Morehouse et al. |
| 5,148,337 A | 9/1992 | Cullen et al. |
| 5,392,177 A | 2/1995 | Chainer et al. |
| 5,440,172 A | 8/1995 | Sutrina |
| 5,781,768 A | 7/1998 | Jones, Jr. |
| 5,905,636 A | 5/1999 | Baska et al. |
| 6,076,171 A | 6/2000 | Kawata |
| 6,143,058 A | 11/2000 | Dahlgren et al. |
| 6,243,656 B1 | 6/2001 | Arai et al. |
| 6,286,212 B1 | 9/2001 | Eaton |
| 6,407,595 B1 | 6/2002 | Huang et al. |
| 6,462,410 B1 | 10/2002 | Novotny et al. |
| 6,504,243 B1 | 1/2003 | Andric et al. |
| 6,624,816 B1 | 9/2003 | Jones, Jr. |
| 6,687,320 B1 | 2/2004 | Chiu et al. |
| 6,778,387 B2 | 8/2004 | Fairchild |
| 6,803,328 B2 | 10/2004 | McCullough |
| 6,832,410 B2 | 12/2004 | Hegde |
| 6,886,625 B1 | 5/2005 | Sagal et al. |
| 6,891,724 B2 | 5/2005 | De Lorenzo et al. |
| 6,896,045 B2 | 5/2005 | Panek |
| 6,956,549 B2 | 10/2005 | Naiki |
| 6,987,671 B2 | 1/2006 | Houle |
| 7,006,353 B2 | 2/2006 | Matteson |
| 7,045,885 B1 | 5/2006 | Chen et al. |

(Continued)

FOREIGN PATENT DOCUMENTS

| | | |
|---|---|---|
| JP | 2000252667 | 9/2000 |
| JP | 200422928 | 1/2004 |

Primary Examiner — Boris Chervinsky
(74) Attorney, Agent, or Firm — Dorsey & Whitney LLP

(57) ABSTRACT

A cooling system for a mobile computing device configured to drive two devices, a fan and an alert device. The fan cools components of the mobile computing device by exchanging air between an inner cavity of the mobile computing device and an outer environment surrounding the mobile computing device. The alert device produces an alert, e.g., a vibration, for the mobile computing device. The cooling system includes a motor operably connected to a first device (either the fan or the alert device) and operably connected via a clutch to a second device (either the fan or the alert device). The clutch allows the second device to be selectively activated depending on a speed or rotational direction of a drive shaft of the motor.

20 Claims, 12 Drawing Sheets

U.S. PATENT DOCUMENTS

| | | |
|---|---|---|
| 7,085,135 B2 | 8/2006 | Chu et al. |
| 7,125,433 B2 | 10/2006 | Garikipati et al. |
| 7,149,909 B2 | 12/2006 | Cui et al. |
| 7,190,585 B2 | 3/2007 | Houle |
| 7,269,015 B2 | 9/2007 | Hornung et al. |
| 7,401,243 B2 | 7/2008 | Knepper et al. |
| 7,433,191 B2 | 10/2008 | Blanco, Jr. et al. |
| 7,440,281 B2 | 10/2008 | Bailey et al. |
| 7,451,332 B2 | 11/2008 | Culbert et al. |
| 7,454,316 B2 | 11/2008 | Bose et al. |
| 7,148,125 B2 | 8/2009 | Takayama et al. |
| 7,730,336 B2 | 6/2010 | Marinkovic et al. |
| 7,782,613 B2 * | 8/2010 | Harris .......................... 361/695 |
| 7,840,827 B2 | 11/2010 | Dahan et al. |
| 7,866,941 B2 | 1/2011 | Li et al. |
| 7,880,586 B2 | 2/2011 | Fagrenius et al. |
| 7,882,369 B1 | 2/2011 | Kelleher et al. |
| 8,165,646 B2 * | 4/2012 | Zheng ........................ 455/575.2 |
| 8,345,414 B2 * | 1/2013 | Mooring et al. ......... 361/679.21 |
| 2005/0077614 A1 | 4/2005 | Chengalva et al. |
| 2006/0120051 A1 | 6/2006 | Macris et al. |
| 2008/0049394 A1 * | 2/2008 | Nishi ............................ 361/695 |
| 2009/0044407 A1 | 2/2009 | Blanco, Jr. et al. |
| 2009/0284534 A1 | 11/2009 | Hendry et al. |
| 2010/0103147 A1 | 4/2010 | Sumpter |
| 2011/0194252 A1 * | 8/2011 | Wang ............................ 361/695 |

* cited by examiner

COOLING SYSTEM FOR MOBILE ELECTRONIC DEVICES

TECHNICAL FIELD

The present invention relates generally to computing devices, and more specifically, to cooling devices for computing devices.

BACKGROUND

Electronic devices are ubiquitous in society and can be found in everything from wristwatches to computers. Additionally, portable or mobile electronic devices (e.g., smart phones, cell phones, MP3 players, portable gaming devices, and the like) are being used for more complex computing processes. The desire for mobile electronic devices to be able to perform more complex processes requires faster and more powerful processing devices. However, faster and more powerful processing devices may produce more heat than prior processors used in mobile devices. This may be a problem as many mobile electronic devices are designed to be small and compact, thus there many not be extra room within an enclosure for heat to dissipate.

SUMMARY

One example of the disclosure may take the form of a mobile computing device including a processor, a receiving port, a motor, a fan and an alert device. The receiving port is in communication with the processor and is configured to receive a plug for an output device. The receiving port may include an input aperture configured to provide a communication channel between an inner surface of the mobile communication device and an outer surface of the mobile communication device. The motor is in communication with the processor, and the fan is operably connected to the motor. The fan is selectively activated and at least a portion of the fan is substantially aligned with the input aperture of the receiving port. Finally, the alert device is operably connected to the motor and is configured to be selectively activated to produce an alert for the mobile computing device.

Another example of the disclosure may take the form of a portable electronic device. The portable electronic device may include an enclosure defining a cavity, a receiving port, and a cooling system. The receiving port is formed in to the enclosure and configured to receive a plug electronically connected to an external device. The receiving port includes a first aperture defined through the receiving port and connecting the cavity of the enclosure with an outer surface of the enclosure. The cooling system is operably connected to an alert device and the enclosure. The cooling system includes a motor and a fan operably connected to the motor and substantially aligned with at least a portion of the first aperture of the receiving port, such that air passing between the outside and the inside of the enclosure passes at least partially around the fan.

Still other examples of the present disclosure may take the form of a cellular phone. The cellular phone may include an enclosure defining a cavity, a processor operably connected to an inner surface of the enclosure and a jack operably connected to the enclosure. The jack is configured to provide an air pathway between the cavity and an outer environment of the enclosure. Finally, the cellular phone may also include a cooling system operably connected to the inner surface of the enclosure. The cooling system is configured to exchange air between the cavity and the outer environment via the jack.

SPECIFICATION

Overview

Figure 1:
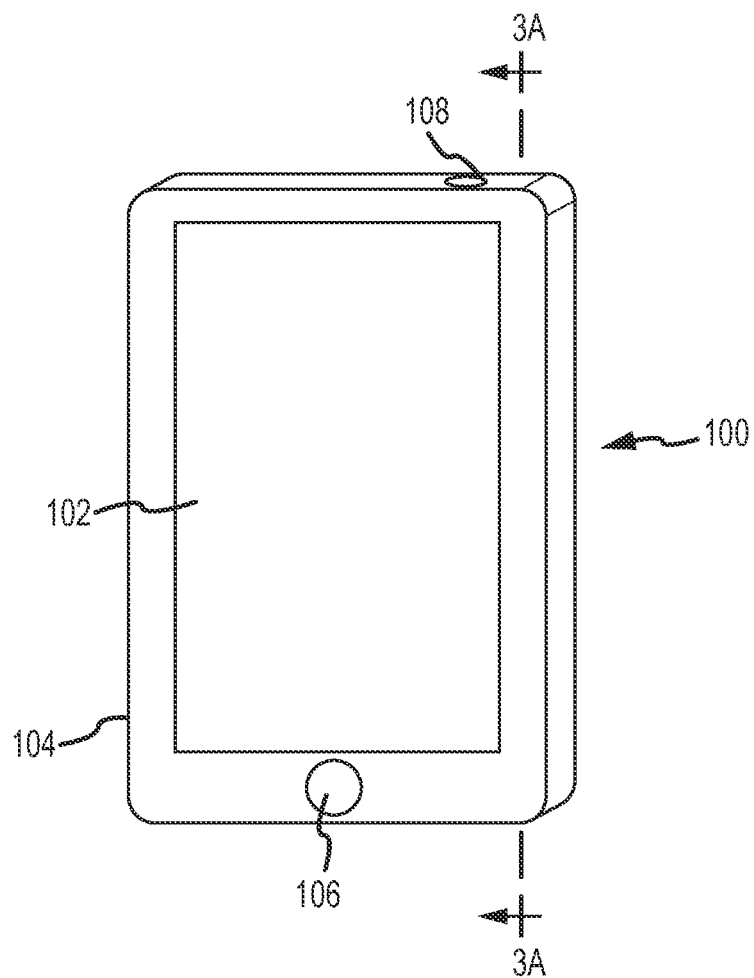
FIG. 1 is an isometric view of a mobile computing device.

Certain embodiments herein take the form of a cooling system for a mobile computing device. The cooling system may be operably connected to an alert and/or vibrating system, so that a single motor may rotate both a fan and a second device, such as a mass that when rotated, vibrates the mobile computing device. The cooling system may be positioned within an enclosure of the device so that it may cool various components of the device, such as a processor, battery, and/or other components that may become overheated in certain conditions. For example, the cooling system may pass air over the various devices within the enclosure; likewise, the cooling system may exhaust warm air from within the enclosure to outside of the enclosure.

The cooling system may include a fan that receives air via an intake through an opening in the device enclosure, such as an audio port. Alternatively, the fan may exhaust air out through the audio port or an input port. The fan may be operably connected to a motor in order to selectively pull or push air through the intake to cool the various components of the mobile computing device within the enclosure.

The cooling system also may include a motor, a drum and a clutch. Further, the cooling system may be connected to a mass. The motor may selectively rotate or otherwise move the mass and the fan. The motor may be selectively connected to both the fan and the mass. For example, the mass may be used as an alert function for the mobile computing device to indicate various states or statuses of the mobile computing device (e.g., a call or message being received, a low battery state, receipt of a message, a timed reminder, and so forth). The motor may rotate the mass when the mobile computing device is in the proper status. The motor is also operably connected to the fan, and may cause the fan to rotate when a select temperature is reached within the enclosure or other activating status is reached.

The cooling system is configured so that the vibrating mass and/or the fan may be selectively engaged with the motor. The clutch may be positioned between the drive shaft of the motor and the mass or the fan. The clutch may selectively operably connect the fan and/or mass to the drive shaft of the motor. In these embodiments, the motor may selectively rotate the fan or the vibrating mass, so that the fan may cool select components without vibrating the device or vice versa. For example, the motor may be configured to rotate both the fan and the mass, but the mass may not rotate every time the fan rotates and the fan may not rotate every time the mass rotates. Thus, the cooling system may require only a single motor to operate two separate devices, but the mobile computing device may not vibrate every time the fan is operated, thereby saving power and reducing operational noise.

The clutch is operably connected to the motor and selectively engages a drum to operably connect either the rotating mass or the fan to the motor. In some embodiments, the clutch may selectively engage and disengage the mass and/or fan based on the rotational speed of a drive shaft of the motor. For example, the clutch may include engagement members operably connected to a hub of the clutch via flexible members, such as a spring, or may be configured to flex due to a living hinge. The engagement members selectively connect to a drum shaft, or second drive shaft that controls the select component (e.g., the other component not connected to the motor drive shaft). When the speed of the motor exceeds a threshold a centrifugal force generated by the clutch hub causes the engagement members to move outward. The engagement members may frictionally engage an inner surface of the drum, causing the second drive or drum drive shaft to rotate at approximately the same rate as the motor drive shaft.

Additionally, the engagement members may be selectively activated to engage the drum based on a rotational direction of the motor drive shaft. For example, in other embodiments, the clutch may include a ratchet and pawl mechanism. In these embodiments, the pawl may be operably connected to a ratchet wheel to substantially prevent the ratchet wheel from rotating in a select direction, while permitting rotation in an opposing direction. The pawl may engage the clutch to prevent the alert device or the fan from rotating regardless of the speed of the motor.

DETAILED DESCRIPTION

Figure 2:
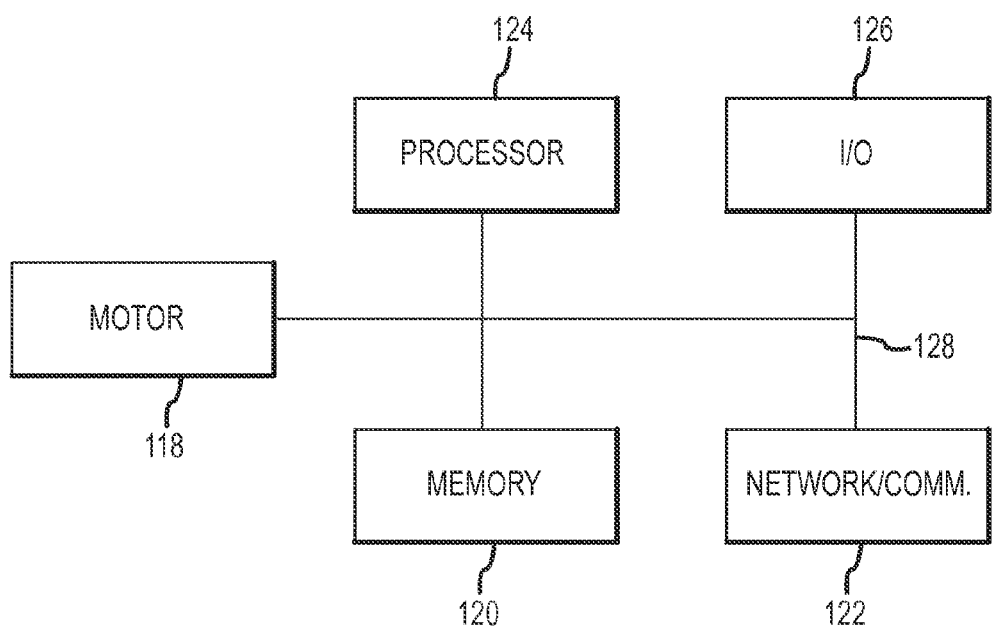
FIG. 2 is a simplified block diagram of the mobile computing device.
Figure 3A:
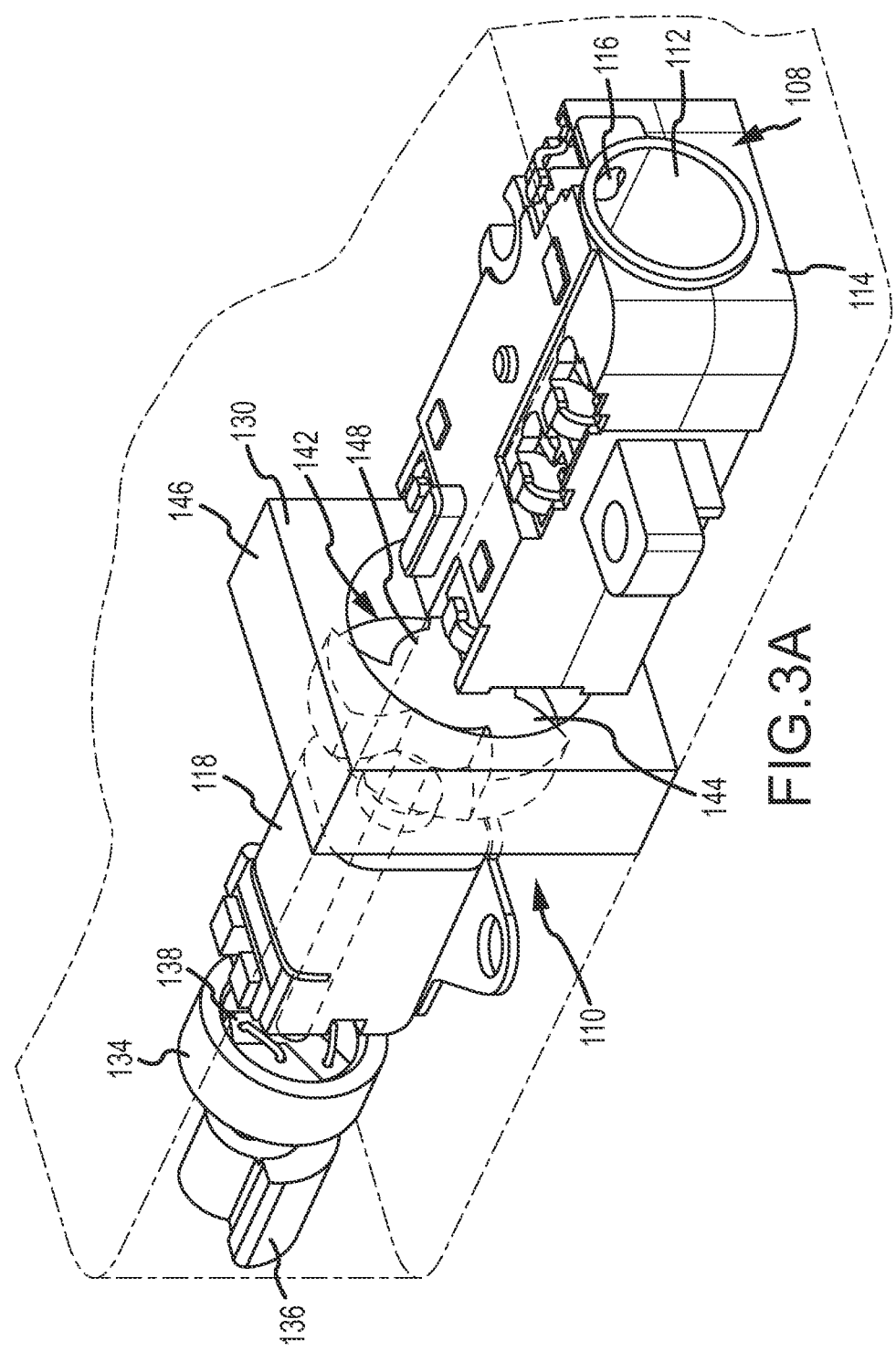
FIG. 3 is a cross-sectional view of a portion of the mobile computing device viewed along line 2-2 in FIG. 1, illustrating a cooling system with various components of the mobile computing device hidden for clarity.
Figure 3B:
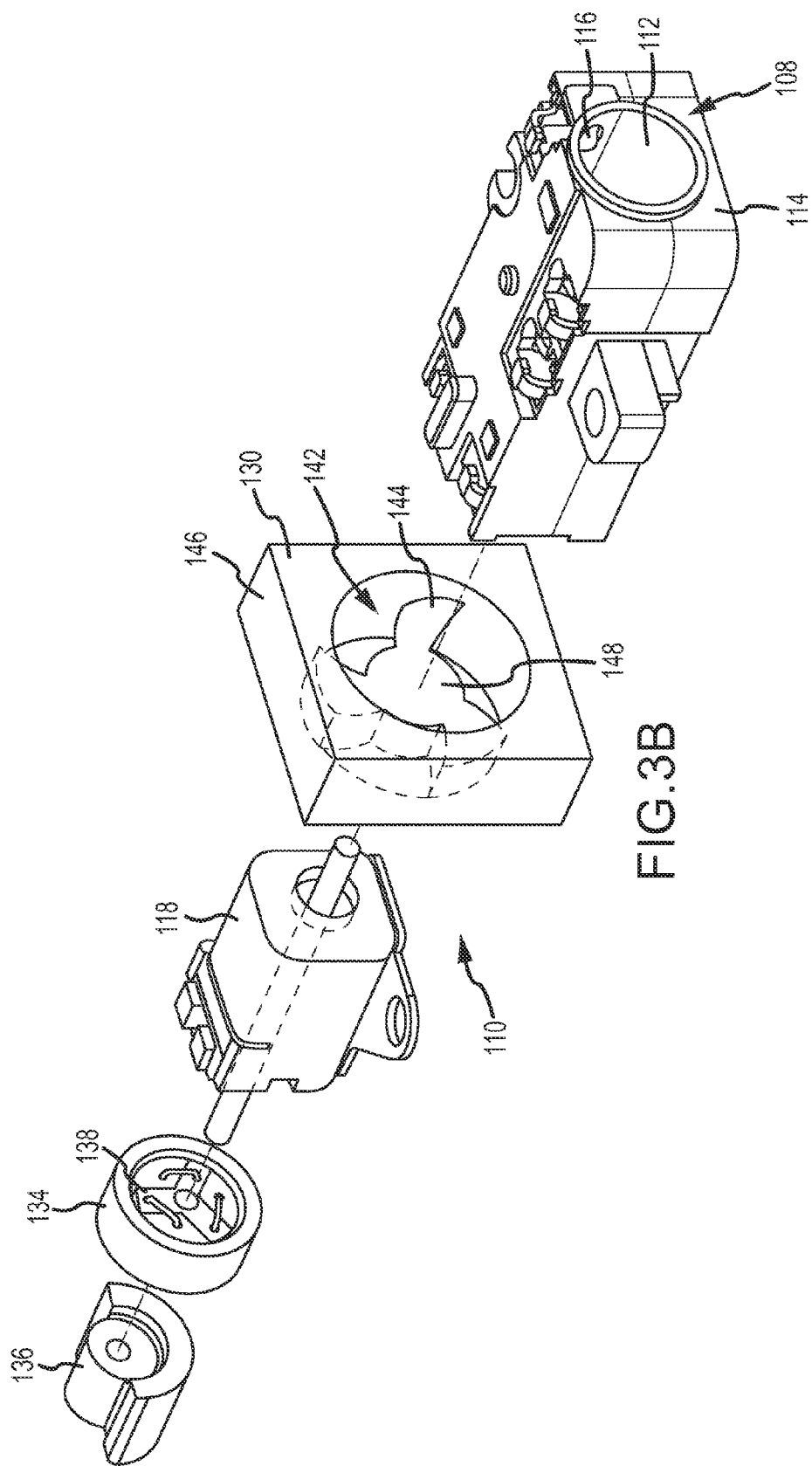

FIG. 1 is an isometric view of a mobile computing device 100, FIG. 2 is a block diagram of an embodiment of the mobile computing device 100. FIG. 3 is a cross-section view of the mobile computing device 100 viewed along line 3-3 in FIG. 1 with various components of the mobile computing device 100 omitted for clarity. The mobile computing device 100 may include a cooling system 110 for cooling or circulating air or other coolants across various components. The mobile computing 100 device may be virtually any type of electronic device, such as a smart phone (e.g., iPhone by APPLE), digital music player (e.g., MP3 player), video gaming device, tablet computer, and so on.

The mobile computing device 100 may include any or all of the cooling system 110, an enclosure 104 at least partially surrounds various components of the device 100, a display screen 102, an input member 106, and a receiving port 108. The enclosure 104 defines a cavity that may at least partially enclose the various components of the mobile computing device 100. Additionally, the enclosure 104 may define an aperture in order to allow select components to extend past or communicate outside, the enclosure. For example, a button or switch may be inserted through an aperture in the enclosure so that a user may activate the button, or a charging plug or audio plug may be inserted or positioned through an aperture of the enclosure to communicate with internal components.

The display screen 102 provides an output for the mobile computing device 100. The display screen 102 may be a liquid crystal display screen, plasma screen, and so on. Additionally, in some embodiments the display screen 102 may function as both an input and an output device. For example, the display screen 102 may include a capacitive input sensors so that a user may provide input signals to the mobile computing device 100 via his or her finger.

The input member 106 permits a user to provide input to the mobile computing device 100. The input member 106 may be one or more buttons, switches, or the like that may be pressed, flipped, or otherwise activated order to provide an input to the mobile computing device 106. For example, the input member 106 may be a button to alter the volume, return to a home screen, or the like. Additionally, the input member 106 may be virtually any size, shape, and may be located in any area of the mobile computing device 100. Furthermore, the input member 106 may be combined with the display screen 102 as a capacitive touch screen.

Referring to FIGS. 1 and 3, the mobile computing device 100 may also include a receiving port 108 configured to receive a plug such as an analog audio plug, charging cord, output device, a tip ring sleeve connector, and the like. The receiving port 108 is formed in the enclosure 104 to electrically connect an external device (e.g., headphones, speakers) to one or more internal components of the mobile computing device 100. The receiving port 108 forms a body that defines an input aperture 112 configured to provide a pathway between the outside surface of the mobile computing device and the internal components surrounded or encased bye the enclosure. For example, the input aperture 112 may be in fluid communication (e.g., exchanging air between the cavity and the outer surface of the mobile computing device 100).

Figure 4:
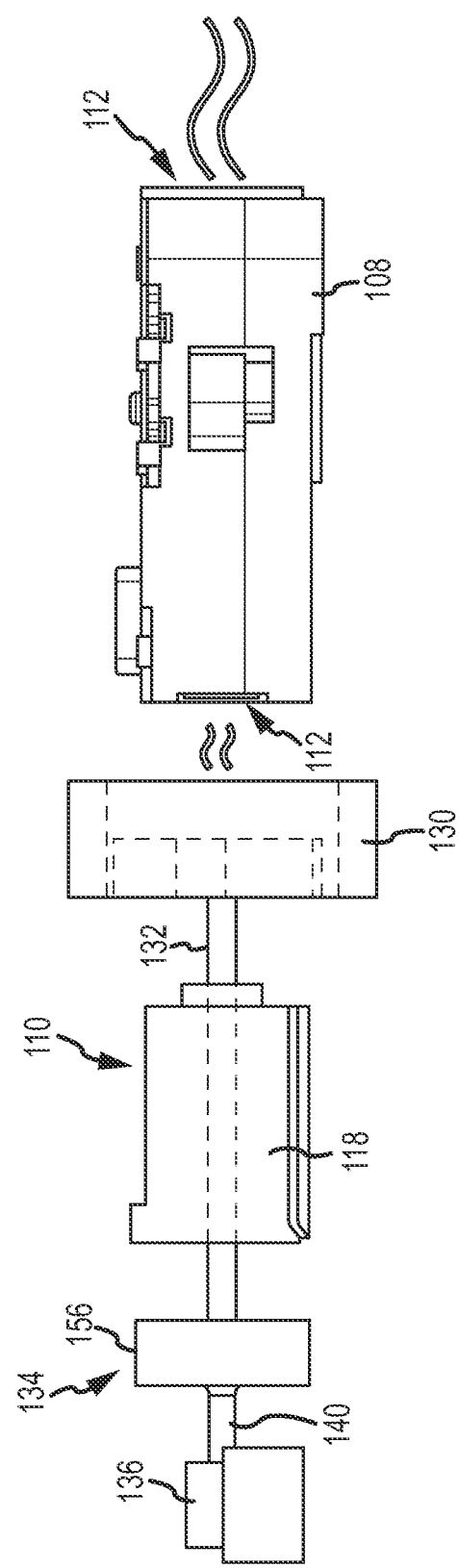
FIG. 4 is a side elevation view of the cooling system illustrated in FIG. 3.

Referring to FIGS. 3 and 4, the input aperture 112 may be at least partially exposed on an outside surface of the mobile computing device 100. This allows for a plug to be inserted into the input aperture 112, without requiring the enclosure 104 to be removed. In other examples, the input aperture 112 may terminate before the enclosure and be aligned with the aperture or port defined within the enclosure. Additionally, as mentioned above, the input aperture 112 may be able to provide an air pathway between an outside surface of the mobile computing device 100 and the internal components surrounded or encased by the enclosure 104. Thus, the input aperture 112 provides an intake and/or an exhaust for the cooling system 110.

The receiving port 108 is configured to receive a plug (not shown), which may be inserted into an input aperture 112. As shown in FIGS. 3 and 4, the receiving port 108 may include a main body 114 defining the input aperture 112 from a first end to a second end. The input aperture 112 may run the entire length of the body 114, and may include an open front and back end. In these embodiments, the receiving port 108 may have an opening defined throughout the main body 114. The input aperture 112 may include electrical contracts 116 lining its sides, and the electrical contacts 116 may be aligned with a corresponding receiver contract on the plug (not shown).

The mobile computing device 100 also includes a cooling system 110 operably connected to the enclosure 104. The cooling system 110 is configured to be partially aligned with the receiving port 108 and may provide multiple functions. For example, the cooling system 110 may cool the internal components of the mobile computing device 100 encased within the enclosure 104, and may also provide an alert function (e.g., a vibration) for select status alerts for the mobile computing device 100 (e.g., phone call, text message, and so on). The cooling system 110 is discussed in more detail below.

FIG. 2 is a block diagram of an embodiment of the mobile computing device 100 illustrating select electrical components. The mobile computing device 100 may include a processor 124, memory 120, a network/communication interface 122, and an input/output interface 126 all connected together by a system bus 128. The mobile computing device 100 may include additional components that are not shown; and FIG. 2 is meant to be exemplary only.

The network/communication interface 122 may receive and transmit various electrical signals. For example, the network/communication interface 122 may be used to place phone calls from the mobile computing device 100, may be used to receive data from a network, or may be used to send and transmit electronic signals via a wireless or wired connection (e.g., Internet, WiFi, Bluetooth, or Ethernet).

The memory 120 may store electronic data that may be utilized by mobile computing device 100. For example, the memory 120 may store electrical data e.g., audio files, video files, document files, and so on, corresponding to various applications. The memory 120 may be, for example, non-volatile storage, a magnetic storage medium, optical storage medium, magneto-optical storage medium, read only memory, random access memory, erasable programmable memory, or flash memory.

The processor 124 may control operation of the mobile computing device 100 and its various components. The processor 124 may be in communication with the cooling system 110 and may activate the cooling system 110 as necessary or desired. The processor 124 may be any electronic device cable of processing, receiving, and/or transmitting instructions. For example, the processor 124 may be a microprocessor or a microcomputer.

The input/output interface 126 facilitates communication by the mobile computing device 100 to and from a variety of devices/sources. For example, the input/output interface 126 may receive data from user, control buttons on the mobile computing device 100, and so on. Additionally, the input/output interface 126 may also receive/transmit data to and from an external drive, e.g., a universal serial bus (USB), or other video/audio/data inputs.

Figure 5:
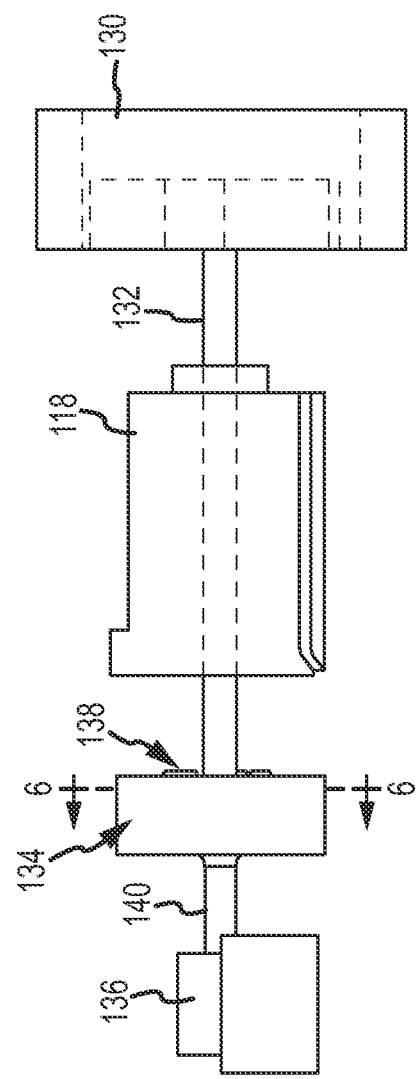
FIG. 5 is an enlarged side elevation view of the cooling system illustrated in FIG. 3.

FIG. 4 is a side elevation view of the cooling system 110 for the mobile computing device 100 illustrating the positional relationship of the receiving port 108. FIG. 5 is a side elevation view of the cooling system 110 alone. Referring to FIGS. 3-5, the cooling system 110 may include a motor 118 electrically connected to the processor 124 and operably connected to a fan 130 and an alert device 136. The motor 118 may be operably connected to the fan 130 by a drive shaft 132 and may be connected to the alert device 126 by a clutch 138 and drum 134 (via a drum drive shaft 140). Thus, the motor 118 is configured to selectively rotate the fan 130 and the alert device 136. Also, it should be noted that, although the fan 130 is illustrated as a primary device (for example, connected to the drive shaft 132 of the motor 118), in some embodiments the fan 130 is connected to the motor 118 as the secondary device (that is connected to the motor 118, the drum 134, and clutch 138) and the alert device 136 may be the primary device (see, e.g., FIG. 6).

The motor 118 may be substantially any device that can be configured to move or rotate a drive shaft 132. For example, the motor 118 may be a direct current motor that is configured to be activated when an input voltage (or other signal) is provided by the processor 126. However, other alternatives are possible. For example, the motor 118 may be an electrical actuator. The motor 118 is configured to engage the fan 130 or the alert device 126 depending on a signal from the processor 126.

A drive shaft 132 is operably connected to, and rotated by the motor 118. The drive shaft 132 may extend through a body of the motor 118, so that the drive shaft 132 may rotate a device on either side of the motor 118. In other embodiments, the drive shaft 132 may be separated into two separate members, namely one extending from each side of the motor 118. It should be noted that the motor 118 may be powerful enough to rotate the drive shaft 132, even when a load or mass is applied the ends of the drive shaft 132 ends. For example, in one embodiment, the drive shaft 132 may be operably connected to two separate devices (fan 130 and alert device 136) and the motor 118 is powerful enough to rotate both devices simultaneously.

The device (fan 130 or alert device 136) connected to the motor 118 via the drive shaft 132 may rotate whenever the motor 118 is powered or operating. However, the device that connects to the motor 118 via the clutch 138 and drum 134, typically is activated selectively, depending on a speed or other indicator of the motor 118, and may not rotate every time the drive shaft 132 rotates.

The fan 130 is operably connected to a first end of the drive shaft 132 such that, as the drive shaft 132 rotates, the fan 130 rotates. As shown in FIGS. 3 and 4, the fan 130 may be positioned within the enclosure 104 and is substantially aligned with the input aperture 112 of the receiving port 108. This positioning allows the fan 130 to communicate air between the enclosure 104 and the outside the enclosure 104.

Referring now to FIGS. 3 and 5, the fan 130 may include a fan body 146 defining a center aperture 148 that houses or encircles a fan hub 142. The fan hub 142 is operably connected to the drive shaft 132 and thus rotates as the drive shaft 132 rotates. Blades 144 extend outward from a center of the fan hub 142 and are intermittently spaced around the fan hub 142. The blades 144 also rotate as the drive shaft 132 rotates.

It should be noted that, in some embodiments, the fan 130 may include the fan hub 142 and the blades 144, but not the fan body 146. For example, the enclosure 104 may provide substantial protection of the blades 144 and the fan body 146 may be omitted.

As the blades 144 and the fan hub 142 rotate, the blades 144 pull air from one direction and push the air in another direction. In one embodiment, the blades 144 may rotate and pull air through the input aperture 112 within the receiving port 108 and push it through the cavity of the mobile computing device 104 defined by the inner surfaces of the enclosure 104. Air external to the mobile computing device 100 may be substantially or partially cooler than air trapped within the enclosure 104 cavity; this air may be moved through the cavity to cool internal components. For example, as the processor 126 operates it may produce heat which may need to be dissipated so that the processor 126 may not overheat or be damaged. The fan 130 may push air across the processor 126 to cool it.

Alternatively, the blades 144 may exhaust air from within the mobile computing device 100 out through the receiving port 108. For example, the blades 144 may rotate to pull air from within the cavity defined by the enclosure 104 and then push the air outside of the enclosure 104 via the input aperture 112 of the receiving port 108. As air internal to the mobile computing device 100 may be heated from heat produced by the internal components of the mobile computing device (e.g., the processor 126), the hot or warm air may be pushed outside of the enclosure 104. Thus, by exhausting the hot or warm air, non-heated air may be pulled or circulated around the components of the mobile computing device 100.

In these embodiments, the fan 130 is positioned within the enclosure 104 so that the blades 144 may be aligned or partially aligned with the input aperture 112 of the receiving port 108. This positioning provides for an efficient cooling mechanism for components of the mobile computing device 100 such as the processor 126, as air from within the cavity of the enclosure 104 can be exchanged with air from an environment surrounding the mobile computing device 100 of exhausted to the exterior environment.

In other embodiments, the fan 130 may be positioned within the enclosure 140 so that the blades may be aligned or partially aligned with other apertures defined in the enclosure 104, other than the input aperture 112 for the receiving port 108. For example, the blades 144 may be at least partially aligned with a speaker grill, beneath a button or a switch, or other openings/ports within the mobile computing device 100.

Referring to FIGS. 4 and 5, the alert device 136 may be selectively connected to the motor 118. The mobile computing devices 100 may include multiple alerts such as an audio tone, a light, and a vibration. The alert device 136 may function to alert a user to a notification. The alert device 136 may be a mass or other member that may be configured to produce a vibration when rotated. For example, the alert device 136 may be a weight that is operably connected off-center or eccentric to a drive shaft that rotates the alert device 136. Thus, as the alert device 136 is rotated, the off-centered connection and the rotation may cause the mobile computing device 100 to vibrate. The alert device 136 may be configured to provide the vibration level desired. For example, the larger the alert device 136, the more substantial the vibrations resulting from its rotation.

In one embodiment, the alert device 136, when the clutch 138 is engaged, may be operably connected to the motor 118 via the drum 134. The clutch 138 selectively engages the drum 13, which is operably connected to the alert device 136 via a drum shaft 140. For example, the motor 118 may rotate the drive shaft 132 rotating the fan 130. However, the clutch 138 may prevent the alert device 136 from also rotating as the clutch 138 may not engage the drum 140. However, the clutch 138 may be selectively activated and may then engage the drum 134. Once the drum 134 is engaged, the alert device 136 may rotate as well.

In the engagement of FIG. 6, the drum 134 is operably connected to the alert device 136 and the clutch 138. The drum 134 includes an engagement body 156 that may be a partially or substantially hollow cylindrical body and configured to receive a portion of the clutch 138. The engagement body 156 is open on a first, or front, side and closed on a second, or back, side. The drum 134 further includes a drum shaft 140 extending from a back of the engagement body 156. The drum 134 is configured to rotate when engaged by or otherwise operably connected to, the clutch 138.

Figure 6A:
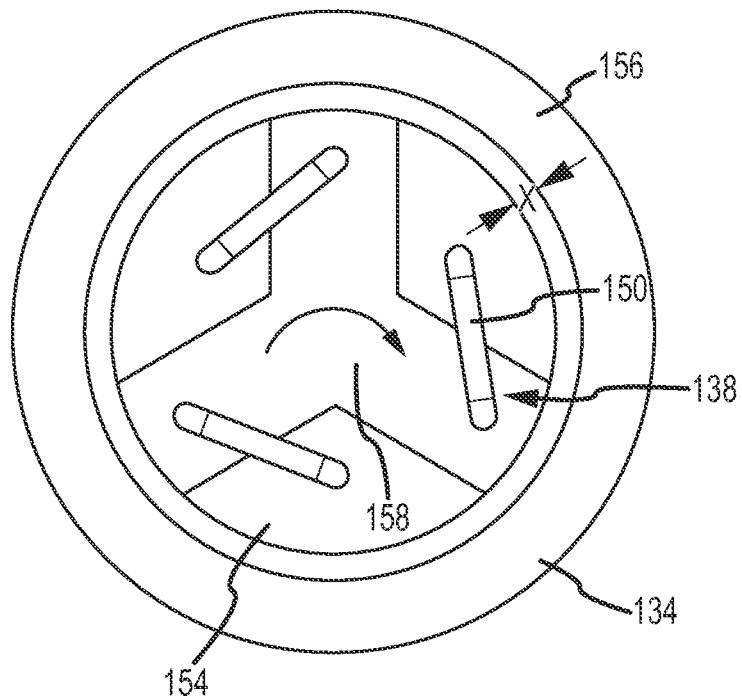
FIG. 6A is a front elevation view of a drum operably associated with a clutch of the cooling system illustrated in FIG. 3, showing the clutch disengaged from the drum.
Figure 6B:
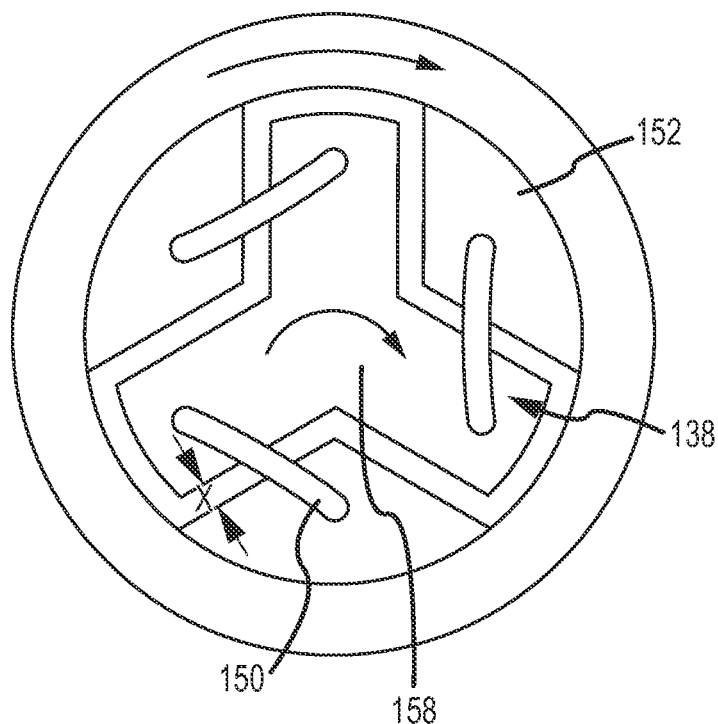
FIG. 6B is a front elevation view of the drum operably associated with the clutch of the cooling system illustrated in FIG. 3, showing the clutch engaged with the drum.

The clutch 138 is inserted into the engagement body 156 of the drum 134 and may selectively engage the drum 134. FIG. 6A is a cross-section view of drum 134 operably connected to the clutch 138 with the clutch 138 disengaged from the drum 134 and FIG. 6B is a cross-section view of the drum 134 operably connected to the clutch 138 and engaged with the clutch 138. The clutch 138 includes a hub 158 and engagement members 154 operably connected to the hub 158 via flexible members 150.

The hub 158 is positioned within a portion of the engagement body 156 but may not contact the inner surface of the engagement body 156 in the absence of centrifugal forces. For example, the hub 158 may be spaced from the engagement body 156 by a distance X. The hub 158 may be Y-shaped with arms extending radially from a center point of the Y-shaped body.

The engagement members 154 operably connect to a portion of each hub 158 arm. Additionally, outer surfaces of the engagement members 154 may be shaped to generally correspond to the outer perimeter of the hub 158. For example, a portion of a perimeter of each engagement member 154 may be triangular shaped and be positioned between each arm of the hub 158. The engagement members 154 engage an inner surface of the engagement body 156 at select motor speeds. For example, the engagement members 154 may move outwards from the center point of the hub 158 a distance X and be adjacent to an inner surface of the engagement body 156. The engagement members 154 may include a surface texture or frictional surface on an outer surface to better allow the engagement members 154 to engage the engagement body 156.

The flexible members 150 are connected to the arms of the hub 158 and to the engagement members 154. These flexible members 150 selectively frictionally connect the engagement members 154 to the hub 158. For example, in one embodiment, the flexible members 150 allow the engagement members 154 to move between contacting the engagement body 156 and the hub 158. The flexible members 150 may be springs or other flexible materials that hold the engagement members 154 in place during select rotational speeds but also allow the engagement members 154 to flex away from the hub 158 under sufficient centrifugal force. The flexible members 150 may exert an initial or biasing force against the engagement members 154 in order to maintain the engagement members 154 adjacent the hub 158. This biasing force may be less than a centrifugal force at selected speeds, thereby allowing the engagement members 154 to swing outwards from their initial position adjacent the hub 158 at the select speed or greater.

As shown in FIG. 6A, when the engagement members 154 are in an initial position, such as a disengaged position, there may be a distance X between each engagement member 154 and the inner surface of the engagement body 15. Further, the engagement members 154 may be in contact with or adjacent to an outer surface of the hub 158. As described above, the flexible members 150 may include a biasing or initial force that may hold the engagement members 154 in position adjacent the hub 158 while the clutch 138 rotates at a less select speed. When the clutch 138 is disengaged and the engagement members 154 positioned away from the engagement body 156, the alert device 136 will not rotate. This is because the drum shaft 140 is not operably connected to the drive shaft 132, and the clutch 138 therefore rotates within the engagement body 156 without substantially contacting the engagement body 156.

Referring now to FIG. 6B, as the motor 118 increases the speed of the drive shaft 132, the clutch 138 engages when the select speed is reached. As the speed of the drive shaft 132 reaches a particular rotational velocity, the centrifugal force exerted on the engagement members 154 overcomes the biasing force of the flexible members 154, thereby forcing the engagement members 143 outward. This allows the engagement members 154 to be pulled outward by the centrifugal force. The engagement members 154 separate from their cradled positioned adjacent the hub 158 when flexed outwards. The flexible members 150 allow the engagement members 154 to move outwards from the hub 158 to engage with the inner surface of the engagement body 156.

After the engagement members 154 move outward, they may be adjacent to against the inner surface of the engagement body 156. This allows the engagement members 154 to engage the engagement body 156, for example, by a frictional contact between the two surfaces as shown in FIG. 6B.

Once the engagement body 156 and engagement members 154 frictionally connect, the engagement body 156 rotates along with and at substantially the same rotational speed as the clutch 138. This is because, when the clutch 138 is engaged with the drum 134, the drum 134 rotates as the drive shaft 132 rotates. As the drum shaft 140 rotates, the alert device 136 rotates. Thus, when the clutch 138 engages the drum 134, the fan 130 and the alert device 136 both rotate. However, when the clutch 138 is disengaged, only the fan 130 rotates. This selective engagement configuration permits the single motor 118 to operate two separate devices, possibly saving space and energy for the mobile computing device 100. Additionally, the clutch mechanism 138 may also prevent the alert device 136 from being activated when cooling is necessary (and preventing false alerts). This helps to decrease the noise associated with the mobile computing device 100 when the cooling system 110 is activated. For example, this selective engagement configuration prevents the mobile computing device 100 from vibrating (due to the alert device 136) every time that the fan 130 is activated.

Alternative Configurations of the Cooling System

Figure 7:
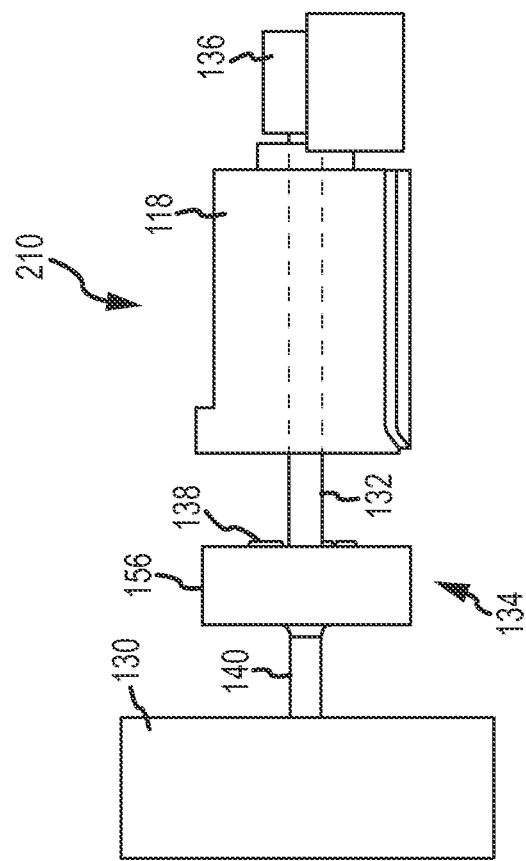
FIG. 7 is a side elevation view of a second embodiment of the cooling system for a mobile computing device.
Figure 8:
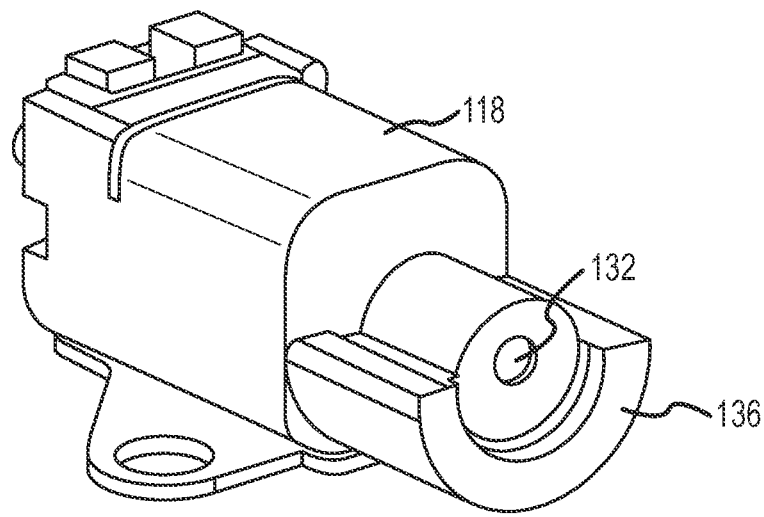
FIG. 8 is an isometric view of a motor operably connected to a vibrating mass of the cooling system illustrated in FIG. 7.
Figure 9:
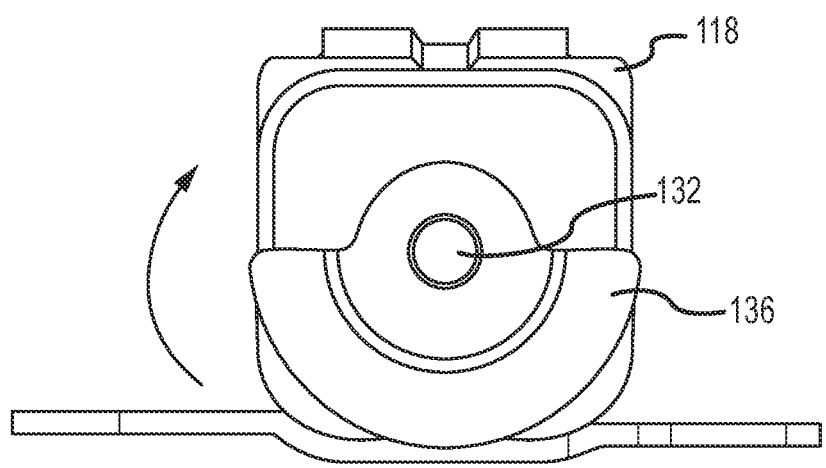
FIG. 9 is a front elevation view of the motor operably connected to the vibrating mass illustrated in FIG. 8.

FIG. 7 is a side elevation view of another configuration of the cooling system 210. FIG. 8 is an isometric view of the motor 118 operably connected to the alert device 136 via the drive shaft 132. FIG. 9 is a front elevation view of the motor 118 operably connected to the alert device 136. In the configuration illustrated in FIGS. 7-9, the fan 130 may be selectively connected to the motor 118 via the clutch 138 and drum 134, and the alert device 136 may be operably connected to the motor 118 via the drive shaft 132. In other words, the alert device 136 may be the primary device and may rotate whenever the drive shaft 132 rotates, and the fan 130 may be the secondary device and rotate when the clutch is engaged.

In this configuration, the alert device 136 may be operably connected to the drive shaft 132 and positioned adjacent a first end of the motor 118. In this position, the total length of the drive shaft 132 may be reduced, which in turn may reduce the total length of the cooling system 210. By reducing the size of the cooling system 210, the cooling system 210 may occupy less space in the mobile computing device 100, while also providing cooling to computing elements, such as the processor 126.

As shown in FIG. 7, the fan 130 is connected to the motor 118 via the clutch 138 and drum 134. Thus, the fan 130 may be selectively rotated when the motor 118 drives the drive shaft 132 at a select speed. For example, as discussed above with respect to FIGS. 6A and 6B, the engagement members 154 may only engage the engagement body 156 when the drive shaft 132 reaches a particular rotational speed. Therefore, as the fan 130 is operably connected to the drum shaft 140, the fan 130 may only rotate when the centrifugal force acting on the engagement members 154 is strong enough that the clutch 138 engages the drum 134.

In the cooling system 210 configuration illustrated in FIGS. 7-9 may mask the fan 130 noise by the vibration (or other alert) created by the alert device 136. For example, the fan 130 may make some noise as the blades 144 are rotating. However, because the fan 130 is activated only when the alert device 136 is activated, the sound of the vibration may be louder than the sound produced by the fan 130. Thus, the cooling system 210 illustrated in FIG. 7 may be less perceivable to a user when operating than the embodiment of the cooling system 110 illustrated in FIG. 5. Furthermore, this cooling system 210 is additionally beneficial as the total length of the system 210 may be reduced. This is possible as the alert device 136 may be connected adjacent a first end of the motor 118, reducing a total length of the drive shaft 132.

Alternative Clutch Embodiments

Figure 10A:
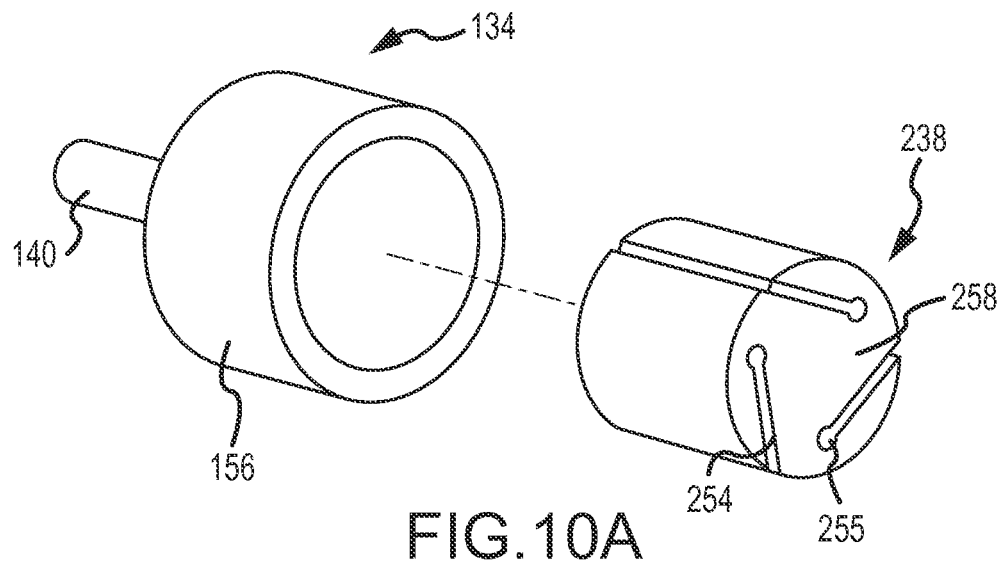
FIG. 10A is a side elevation view of a third embodiment of a clutch for the cooling system.
Figure 10B:
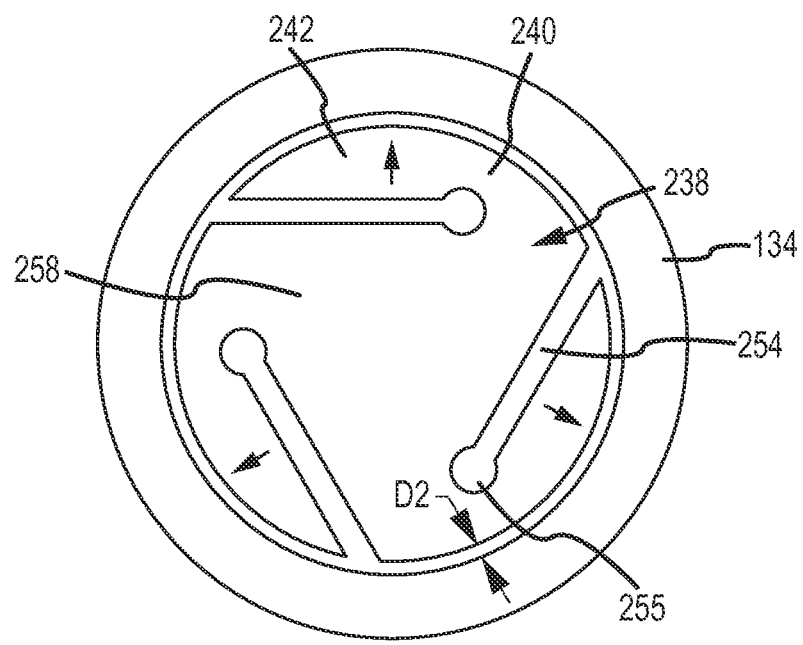
FIG. 10B is a front elevation view of the clutch illustrated in FIG. 10A.

FIGS. 10A and 10B illustrate a second clutch embodiment. In this embodiment, the clutch 238 may include a hub 258 body having engagement arms 242 defined by hinge apertures 254 within the hub 258. The hinge apertures 254 create living hinges 240 within the hub 258, allowing the arms 242 to flex outward. The hub 258 may have a generally cylindrical shape and is inserted within the engagement body 156 of the drum 134. When the clutch 238 is disengaged from the drum 134, the hub 258 may be positioned a same distance from an inner surface of the engagement body 156, shown as D2 in FIG. 10A.

Three hinge apertures 254 are spaced intermittently along the body of hub 258 and form channels within the body of the hub 258. As shown in FIG. 10B, the hinge apertures 254 may form a circular shape with a post extending therefrom on the front face of the hub 258, in that they may have a rectangular body with a head 255 extending from one end. One end of the hinge aperture 254 rectangular body may begin on an outer perimeter surface of the hub 258 and the head 255 may be defined on an internal surface of the hub 258, in other words, towards the central point of the hub 258. Additionally, as the hinge apertures 254 may be defined along the body of the hub 258, they may create channel having a head 255 and a rectangular body through the length of the hub 258.

The hinge apertures 254 reduce a strength of the hub 258 body so that the hub 258 (specifically the engagement arms 242) can flex at the apertures 254. The living hinge 240 is a narrower portion of material and allows the arm 242 to flex upwards, without breaking. For example, the living hinge 240 allows the engagement arms 242 to flex outwards towards an inner surface of the engagement body 156, so that the engagement arms 242 may contact the inner surface of the engagement body 156. Similar to the engagement members 154, the engagement arms 242 may include a texturized or rough outer surface so that they may more easily engage the inner surface of the engagement body 156.

As with the clutch 158 illustrated in FIG. 9, in this embodiment, the clutch 258 may rotate within the drum 134 without engaging the drum 134 until the select rotation speed is reached. However, once the select rotational speed is reached, the engagement arms 242 (via a centrifugal force) may be forced outwards, bending at the living hinge 240. The engagement arms 242 at the correct centrifugal force may then engage an inner surface of the engagement body 156, thus operably connecting the drive shaft 132 and the drum 134.

Figure 11A:
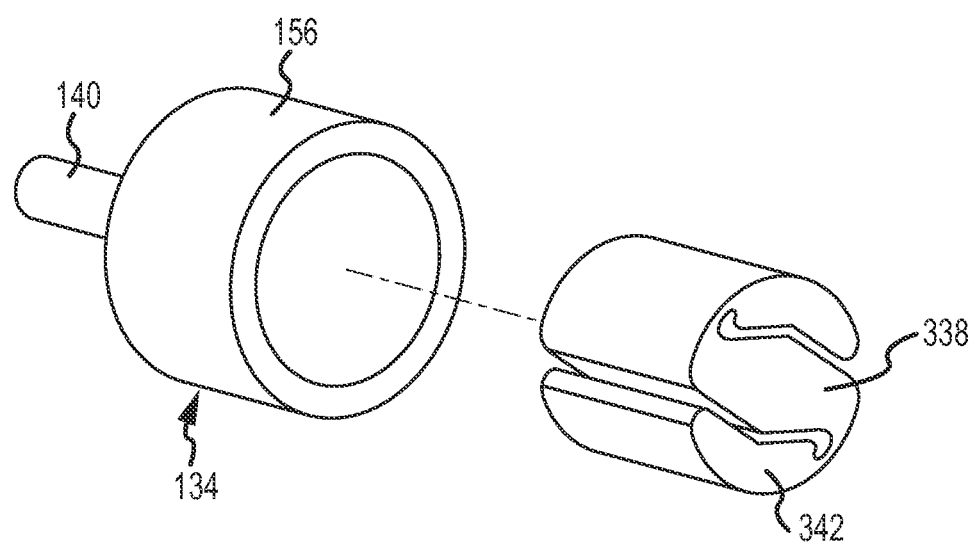
FIG. 11A is a side elevation view of a fourth embodiment of a clutch for the cooling system.
Figure 11B:
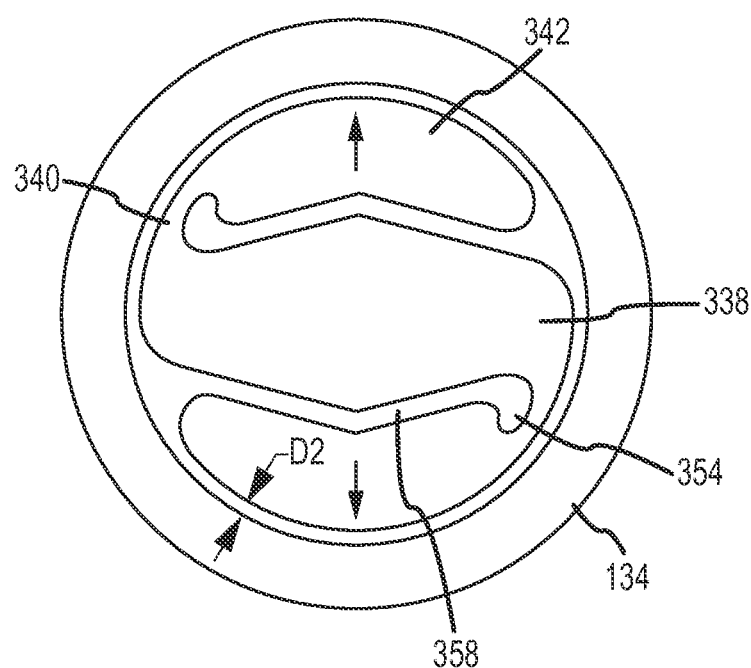
FIG. 11B is a front elevation view of the clutch illustrated in FIG. 11A.

FIGS. 11A and 11B illustrate another example of the clutch 338. This example is similar to the clutch 238 illustrated in FIGS. 10A and 10B. However, in FIGS. 11A and 11B, the clutch 358 may include only two hinge apertures 354 spaced laterally through the hub 358. As with the clutch 258 illustrated in FIGS. 10A and 10B, the hinge apertures 354 create engagement arms 342 by defining a living hinge 340 within the body of the hub 358. The engagement arms 342 extend outwards (rotating at the living hinge 340 location) to transverse the distance X to engage with the engagement body 156.

The hinge apertures 354 may be shaped so that the body of the hub 358 forms a general "S" shape within the engagement body 156. The hinge apertures 354 may each include two relatively rectangular shapes angled outward towards the outer perimeter of the hub 358. The two rectangles may generally intersect at approximately a mid point of the hub 358 so that each hinge aperture 354 has a corner or apex. Additionally, a terminal end of each hinge aperture 354 may include a head 354. The head 354 has a larger dimension than the rest of the hinge aperture 354 so as to thin the material or body of the hub 358 to create the living hinge 340.

Figure 12A:
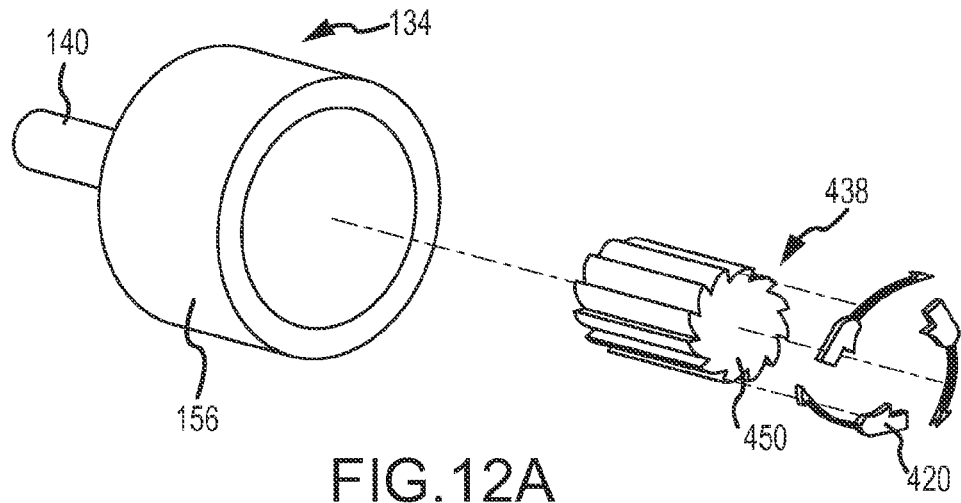
FIG. 12 is a front elevation view of a fifth embodiment of a clutch utilizing a ratchet and pawl configuration for the cooling system.
Figure 12B:
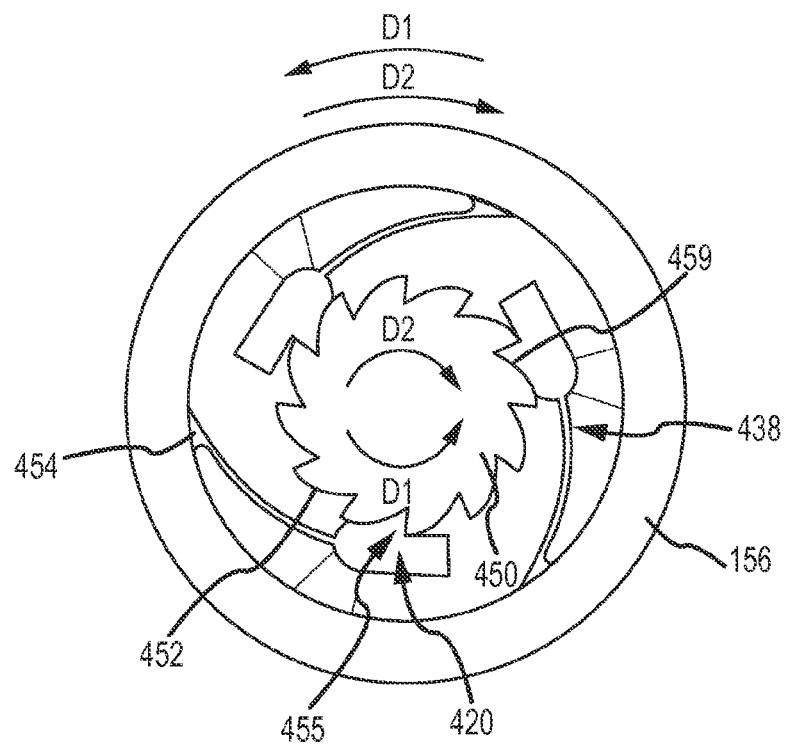

FIG. 12 illustrates a fourth embodiment of the clutch 448. In this embodiment, the clutch 448 may include a ratchet 450 and a pawl 420. The ratchet 450 may form a hub of the clutch and may include teeth 452 extending radially around an outer surface of the ratchet 450. The teeth 452 may be have be arcuate on one side and the second side may be flat or partially concave. Basically, the teeth 452 permit a ratchet motion in one direction and restriction it in another.

The pawl 420 is operably connected to the engagement body 156 and is configured to selectively engage the ratchet 450. There may be multiple pawls 420 spaced intermittently along an inner surface of the engagement body 156. The pawls 420 may include a main body 455 having an engagement portion 459 and a connection portion 454. The engagement portion 459 may be shaped to generally correspond to the teeth 452 of the ratchet 450. For example, one side of the engagement portion 459 may be concave and one side may be substantially straight. This is because the pawl 420 is configured to engage the teeth 452 of the ratchet 450 when the ratchet 450 rotates in one direction and configured to disengage from the teeth 452 when the ratchet 450 rotates in a second direction. The connection portion 454 extends from a back surface of the main body 455 is operably connected to an inner surface of the engagement body 156. The connection portion 454 may be formed at a terminal end of a tail extending from the main body 455.

The ratchet 450 is operably associated with the pawl 420, such that when the ratchet 450 rotates in a first direction D1, the pawl 420 disengages from the ratchet 450. In other words, the teeth 420 may slide around the engagement portion 459 along the concave side, so that the ratchet 450 may rotate but each pawl 420 may not. If the ratchet 450 rotates in an opposing direction D2, the pawls 420 engage the drum 134. For example, as the ratchet 450 rotates in the opposing direction D2, the teeth 452 abut against the engagement portion 459, such that the flat sides of both the teeth 452 and the engage portion 459 are aligned. This alignment allows the teeth 452 to push against the pawl 420, displacing the pawl 420. As the pawls 420 are operably connected to the drum 134 via the connection portion 454, as the pawls 420 are rotated, the drum 134 also rotates.

The clutch 438 of FIG. 12 allows for the clutch 438 to be selectively engaged, regardless of the speed of the drive shaft 132. For example, the ratchet 450 may rotate in direction D1 at substantially any speed without engaging the pawls 420 and thus the drum 134. Similarly, while rotating in direction D2, the ratchet 450 may engage the pawls 420, rotating the drum 134 at substantially any speed. Thus, thus the alert device 136 (or other device operably connected to the motor 118 via the clutch) may be configured to be either on or off, irrespective of the rotational speed of the drive shaft 132 or clutch.

Conclusion

The foregoing description has broad application. For example, while examples disclosed herein may focus on operably rotating a fan and an alert device, it should be appreciated that the concepts disclosed herein equally apply to devices that may be driven by a rotating shaft. In one example, the mobile computing device may include two separate masses configured to selectively rotate to provide increasing alerts. One mass may be configured to rotate to produce a small vibration, and then for certain alerts both masses (via the clutch configuration) may be rotated creating a larger vibration. Accordingly, the discussion of any embodiment is meant only to be exemplary and is not intended to suggest that the scope of the disclosure, including the claims, is limited to these examples.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A mobile computing device, comprising:
   a processor;
   an enclosure at least partially surrounding the processor;
   a motor in electrical communication with the processor;
   a receiving port defining a channel through the enclosure;
   a cooling element selectively operably connected to the motor, the cooling element in fluid communication with the receiving port; and
   a secondary device selectively operably connected to the motor; wherein
   at least one of the cooling element and secondary device are configured to be activated independently of the other.

2. The mobile computing device of claim 1, further comprising a clutch operably connected between the motor and alert device, wherein the clutch is configured to selectively activate the secondary device.

3. The mobile computing device of claim 1, further comprising a clutch operably connected between the motor and the cooling element, wherein the clutch is configured to selectively activate the cooling element.

4. The mobile computing device of claim 1, further comprising a clutch operably connected to the motor and one of the cooling element or the secondary device, wherein the clutch is configured to selectively activate one of the cooling element or the secondary device.

5. The mobile computing device of claim 1, further comprising:
   a drum operably connected to the secondary device comprising
      an engagement body; and a drum shaft extending from the engagement body; and a clutch operably connected the motor and at least partially received within the engagement body of the drum, wherein the clutch is configured to selectively activate the secondary device.

6. The mobile computing device of claim 5, wherein the clutch further comprises:

a hub received within the engagement body;

an engagement member operably connected via a flexible member to the hub; and wherein the engagement member is configured to selectively connect the clutch with the drum.

7. The mobile computing device of claim 6, wherein the motor further comprises a drive shaft operably connected to the hub and configured to selectively rotate the hub, and when the hub reaches a select speed the engagement members engage with an inner surface of the engagement body so that the drum shaft and the drive shaft are rotate at approximately the same speed.

8. The mobile computing device of claim 5, wherein the clutch further comprises a hub configured to be received within the engagement body, the hub defining an engagement arm configured to rotate at a living hinge; and wherein the engagement arm is configured to selectively engage an inner surface of the engagement body so that the hub and the drum rotate at approximately the same speed.

9. The mobile computing device of claim 1, wherein the secondary device is a mass configured to produce a vibration when rotated.

10. A portable electronic device comprising:

an enclosure defining a cavity;

a receiving port adjacent the enclosure, the receiving port defining a passage between an enclosure interior and enclosure exterior, and configured to receive a portion of an external device;

a cooling system connected to the enclosure, comprising:
  a motor; and
  a fan mechanically activated by the motor and in fluid communication with the receiving port; and
an alert device mechanically activated by the motor.

11. The portable electronic device of claim 10, further comprising an alert device operably connected to the motor, wherein the motor is configured to selectively rotate the alert device.

12. The portable electronic device of claim 11, wherein the cooling system further comprises a clutch operably connected to the motor and the alert device.

13. The portable electronic device of claim 12, wherein the cooling system further comprises:

a drum selectively associated with the clutch; and the motor further comprises a drive shaft operably connected to the clutch and configured to selectively rotate the clutch;

wherein the clutch selectively engages the drum and when the drum and the clutch are engaged together, the clutch and the drum rotate at approximately the same speed.

14. The portable electronic device of claim 13, wherein the clutch further comprises:

a hub operably connected to the motor; and an engagement arm configured to selectively engage an inner surface of the drum.

15. A cellular phone, comprising:

an enclosure defining a cavity;

a processor operably connected to an inner surface of the enclosure;

a port adapted to receive a portion of input or output device operably connected to the enclosure and configured to provide an air pathway between the cavity and an outer environment of the enclosure; and a cooling system operably connected to the inner surface of the enclosure, wherein the cooling system is configured to exchange air between the cavity and the outer environment via the port.

16. The cellular phone of claim 15, further comprising a mass operably connected to the enclosure to the cooling system, wherein the mass is configured to selectively rotate to vibrate the enclosure.

17. The cellular phone of claim 16, wherein the cooling system further comprises:

a motor operably connected to the enclosure and in communication with the processor;

a fan operably connected to the motor;

a clutch operably connected to the motor; and a drum operably connected to the mass and selectively operably connected to the clutch.

18. The cellular phone of claim 17, wherein the clutch further comprises:

a ratchet configured to be at least partially received within the drum; and a pawl operably connected to the drum, wherein when the ratchet rotates in a first direction the pawl is operably engaged with the ratchet and when the ratchet rotates in a second direction, the pawl is disengaged with the ratchet.

19. The cellular phone of claim 17, wherein the clutch further comprises a hub defining engagement arms that are configured to selectively engage the drum depending on a rotation speed of the hub.

20. The cellular phone of claim 15, wherein the jack is an audio jack configured to receive a tip connector ring plug.

* * * * *